US010552317B2

(12) United States Patent
Hu et al.

(10) Patent No.: US 10,552,317 B2
(45) Date of Patent: *Feb. 4, 2020

(54) CACHE ALLOCATION IN A COMPUTERIZED SYSTEM (71) Applicant: International Business Machines Corporation, Armonk, NY (US)

(72) Inventors: Xiao-Yu Hu, Horgen (CH); Nikolas Ioannou, Zurich (CH); Ioannis Koltsidas, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/091,222

(22) Filed: Apr. 5, 2016

(65) Prior Publication Data

US 2016/0217071 A1    Jul. 28, 2016

Related U.S. Application Data (63) Continuation of application No. 14/184,922, filed on Feb. 20, 2014, now Pat. No. 9,342,458.

(30) Foreign Application Priority Data

Feb. 28, 2013 (GB) .................................. 1303531.6

(51) Int. Cl.
*G06F 12/02* (2006.01)
*G06F 12/0871* (2016.01)
*G06F 12/0802* (2016.01)

(52) U.S. Cl.
CPC ...... *G06F 12/0253* (2013.01); *G06F 12/0246* (2013.01); *G06F 12/0802* (2013.01); *G06F 12/0871* (2013.01); *G06F 2212/222* (2013.01); *G06F 2212/604* (2013.01); *G06F 2212/702* (2013.01); *G06F 2212/7205* (2013.01)

(58) Field of Classification Search
USPC ....................................................... 711/118
See application file for complete search history.

(56) References Cited

U.S. PATENT DOCUMENTS 5,978,893 A * 11/1999 Bakshi ..................... G11C 8/12
                                                          365/230.03
6,237,060 B1 * 5/2001 Shilts .................. G06F 12/0253
                                                          707/999.202

(Continued)

OTHER PUBLICATIONS

Josephson, A. Direct-Access File System for a New Generation of Flash Memory, PhD Dissertation Presented to the CS Faculty of Princeton University., Apr. 2011, 135 pages.

(Continued)

*Primary Examiner* — Charles J Choi
(74) *Attorney, Agent, or Firm* — Cahn & Samuels, LLP (57) ABSTRACT System and method for operating a solid state memory containing a memory space. The present invention provides a computerized system that includes a solid state memory having a memory space; a controller adapted to use a first portion of the memory space as a cache; and a garbage collector adapted to use a second portion of the memory space to collect garbage in the solid state memory. The controller is adapted to change a size of at least one of the first portion and the second portion of the memory space during operation of the solid state memory.

14 Claims, 2 Drawing Sheets

(56) References Cited

U.S. PATENT DOCUMENTS

| | | | |
|---|---|---|---|
| 6,467,028 B1* | 10/2002 | Kelley | G06F 17/30902 707/E17.12 |
| 6,629,113 B1 | 9/2003 | Lawrence | |
| 7,634,585 B2 | 12/2009 | Conley et al. | |
| 8,219,776 B2 | 7/2012 | Forhan et al. | |
| 8,370,857 B2* | 2/2013 | Kamii | G06F 3/0607 707/705 |
| 2011/0022801 A1 | 1/2011 | Flynn | |
| 2011/0072187 A1 | 3/2011 | Forhan et al. | |
| 2011/0145473 A1 | 6/2011 | Maheshwari | |
| 2011/0191522 A1 | 8/2011 | Condict et al. | |
| 2012/0110249 A1* | 5/2012 | Jeong | G06F 3/0616 711/103 |
| 2012/0144092 A1* | 6/2012 | Hsieh | G06F 12/023 711/103 |
| 2012/0166723 A1 | 6/2012 | Araki et al. | |
| 2012/0173790 A1 | 7/2012 | Hetzler | |
| 2012/0210068 A1 | 8/2012 | Joshi et al. | |
| 2012/0222005 A1 | 8/2012 | Harris et al. | |
| 2012/0246392 A1 | 9/2012 | Cheon | |
| 2012/0311293 A1* | 12/2012 | Nemazie | G11C 16/0483 711/171 |
| 2013/0198453 A1* | 8/2013 | Kim | G06F 12/0871 711/118 |
| 2013/0232377 A1* | 9/2013 | Kakihara | G11C 29/72 714/6.13 |
| 2014/0075100 A1* | 3/2014 | Kaneko | G06F 11/008 711/103 |

OTHER PUBLICATIONS

Roberts, Efficient Data Center Architectures Using Non-Volatile Memory and Reliability Techniques, PhD Dissertation Presented to CS Faulty of Michigan University, 2011, 170 pages.

Office Action in U.S. Appl. No. 14/184,992; Oct. 22, 2015; pp. 1-10.

List of IBM Patents or Patent Applications Treated as Related, Aug. 2019, 2 pages.

* cited by examiner

CACHE ALLOCATION IN A COMPUTERIZED SYSTEM

CROSS-REFERENCE TO RELATED APPLICATION

This patent application is a continuation application of U.S. patent application Ser. No. 14/184,922 filed on Feb. 20, 2014, which claims priority under 35 U.S.C. § 119 from European Patent Application No. GB 1303531.6, filed Feb. 28, 2013, both incorporated herein in their entirety.

BACKGROUND OF THE INVENTION

Field of the Invention

The present invention relates to the field of solid state memory. More specifically, a system and method for operating a solid state memory containing a memory space is presented.

Description of the Related Art

Solid-state memories encompass rewritable non-volatile memory devices which use electronic circuitry such as NAND Flash memories for storing data.

SUMMARY OF THE INVENTION

According to one aspect of the invention, the present invention provides a computerized system including: a solid state memory containing a memory space; a controller adapted to use a first portion of the memory space as a cache for the computerized system; and a garbage collector adapted to use a second portion of the memory space for performing garbage collection in the solid state memory. The controller is adapted to change a size of at least one of the first portion and the second portion of the memory space during operation of the solid state memory.

According to another aspect of the invention, the present invention provides a method for operating a solid state memory containing a memory space. The steps of the method include: using a first portion of the memory space as a cache for a computerized system; performing garbage collection in the solid state memory and using a second portion of the memory space for garbage collected data; and changing a size of at least one of the first portion and the second portion of the memory space during operation of the solid state memory.

DETAILED DESCRIPTION OF THE PREFERRED EMBODIMENTS

The invention and its embodiments will be more fully appreciated by reference to the following detailed description of presently preferred, but nonetheless illustrative, embodiments in accordance with the present invention when taken in conjunction with the accompanying drawings.

The following description first points to a general aspect of the invention, concerning a computerized system and a method for operating a solid state memory. The description then points to the more particularized aspect of the present invention—a computerized system and a method for operating a solid state memory as a cache in such computerized system.

Solid-state memory in general, and solid state drives (SSD) in particular encompass a rewritable non-volatile memory which uses electronic circuitry such as NAND flash memory for storing data.

In a preferred application, a solid state memory is used as a cache. Given that solid state memories offer exceptional bandwidth resulting in high throughput as well as excellent random I/O (input/output) performance resulting in low latency along with an appreciated robustness due to lack of moveable parts, they may be considered as a preferred cache medium. In one preferred embodiment, hence, a solid state memory is used as a cache for an underlying storage system. The storage system can encompass one or more hard disk drives, or one or more optical disk drives, or one or more solid state drives, or a mix of such drives of different technology, and may represent a mass storage for an enterprise storage system, for a personal storage system, or for a web based (cloud) storage system, for example.

An entity accessing such cache can be a host, and specifically, the operating system of such host. The usage of a solid state memory as a cache in a computerized system can improve the performance of the computerized system. The computerized system can encompass at least the solid state memory and the underlying storage system, and in one embodiment, can also include the host accessing the storage system via the solid state memory cache. The cache can be physically located at the same location as the storage system or the host, or at a location remote from the host and the storage system.

In the following embodiments, the computerized system can include one or more of the following features: a size of a first portion of the memory space and a size of a second portion of the memory space accumulating to a total size of the memory space; a controller adapted to change the size of both portions of the memory space by changing the size of one of the first and the second portion of the memory space; the controller adapted to change the size of the first portion of the memory space; the memory space having a set of blocks; the computerized system having a pool of free blocks for returning invalid or unused blocks to from the first portion for reducing said size of the first portion, and for populating free blocks from the free block pool with data to be cached for increasing the size of the first portion; the controller adapted to change the size of the first portion of the memory space if an average read and/or write latency is above or below a certain threshold.

Solid state memories can be characterized in that data can be stored therein in units. A unit can be an entity in the solid state memory device for writing data to and reading data from. Multiples of such units can form a block. A block can be defined as a set of multiple units. In some solid state memory devices, a block denotes the smallest entity for erasure operations which includes that the data of all units of a block can only be erased together.

In the following, terminology of flash technology is referred to, although it is understood that any such disclosure is applicable to other solid state memory technologies, too. Specifically, in NAND flash technology, units are denoted as pages, multiples of which form a block. Hence, read and write operations can be applied to pages as a smallest unit of such operation, and erase operations can only be applied to entire blocks. And while in other storage technologies outdated data can simply be overwritten by new data, flash technology requires an erase operation before new data can be written to an erased block.

For the reason that in flash technology erase operations take longer than read or write operations and can be carried out only at a block granularity, a writing technique is applied called "write out of place." In this technique, new or updated data is written to some free page offered by a free page allocator instead of writing it to the same page where the outdated data resides. The page containing the outdated data is invalidated in this process.

At some point in time, a process called "garbage collection" performed by a software, hardware, or firmware entity denoted as a garbage collector, frees blocks for new writes. This is performed by selecting a block from a set of blocks holding data and moving the content of all valid pages of that block to free pages in different blocks. As a result, the subject block finally includes invalid pages only and can be erased. While this procedure requires some additional write operations in excess, it is apparent that by such approach, immediate as well as frequent erase operations are avoided which would contribute to a much higher overall processing than an overhead of some additional write operations do. A block reclamation scheme can be based on a cyclic buffer, a greedy window, a container marker scheme, or others.

Summarizing, flash memory is being used in a log-structured way because the flash memory is to be erased before it can be re-written. Writing flash memory in a log-structured way hides the high latency introduced by flash erase operations but leads to write amplification, i.e., a unit of actual user/host write can lead to more than one unit of actual flash memory write due to data relocation operations required upon garbage collection where, here, garbage collection refers to the background process of reclaiming memory space occupied by invalid data by relocating valid data in that memory space to another place.

Write amplification, may in turn, have a negative impact on I/O latency and throughput, and may thus limit the overall performance of a solid state memory implemented cache. To avoid excessive write amplification, in a preferred embodiment, a specified size of solid state memory space is reserved for garbage collection purposes, and specifically for depositing the valid data from blocks to be erased to and/or for maintaining a pool of free blocks to be offered for new writes. This process is also called "over-provisioning" of memory space. The over-provisioned memory space— which is also referred to below as second portion of the memory space representing the solid state memory—typically is not exposed/visible to the user/host of the solid state memory. This means, that an exposed size of logical memory space of the solid state memory a user sees—which is also denoted as logical capacity—is less than its total size of the solid state memory, i.e. its physical capacity found inside a solid state drive, for example.

For a traditional use of a solid state memory as a persistent storage device as opposed to a cache, the size of the exposed logical memory space, i.e., the logical capacity of the solid storage memory device communicated to the user, is typically configured when the solid state memory is manufactured or set up in a new system, and remains constant after that.

Changing the logical capacity of the solid state memory after the user has created a file-system and has put its data on is not appreciated given that the user expects the capacity to be constant and all of its data to be there in the future. Consequently, this approach is also valid when a solid state memory is used as a cache in view of lack of a command to allocate memory space to caching or non-caching operations. Hence, the solid state memory used as a cache is designed upfront to have a fixed size exposed to the user/host. This fixed size is also referred to below as a first portion of memory space and is equal to the logical capacity of the device that is advertised to the user/host.

In such an upfront configuration, the size of the memory space usable as cache is preferably set to a maximum level in order to increase a cache hit rate, while dimensioning the memory space reserved for flash management operations such as garbage collection is dimensioned rather low for keeping write amplification within reasonable bounds. Specifically, the size of the second portion of memory space reserved for overprovisioning from the beginning is preferably a minimum value, while an effective size of the second portion used for flash management operations can exceed this reserved minimum size during operation of the solid state memory.

However, there are several scenarios that might result in cache performance degradation due to a sudden increase of write operations to the solid state memory. In a first scenario, when the workload changes, the cache may see a lot of cache misses and thus a higher degree of cache population activity in a short period of time. This leads to a higher actual and average latency and degradation of the overall performance. In a second scenario, when the flash-based cache is used as a write cache, it may happen that its actual and average latency rises particularly when writes come in a bursty way or when the workload is very write-cache-friendly.

In a third scenario, the user may want to change a service level agreement for the flash based cache, for example, and request for a lower access latency for example. However, in contrast to the typical usage of a solid state memory as a persistent storage device the actual size of the cache is not visible to the user/host and the user/host typically does not have a requirement or expectation about the size of the cache at any given time.

Hence, in a preferred embodiment, the first memory portion of the solid state memory assigned to caching activities for a computerized system is changed in its size during its operation. Preferably, this first memory portion has the capability to be changed dynamically, i.e., the first memory portion can be amended in its size which includes being set to a new size, being reset to its original size, etc., and the process takes place while caching operations continue to be performed on this first portion of the memory space.

Hence, in such solid state memory, the size of the first portion of memory space used as a cache for said computerized system is adaptable, preferably by a controller making use of this first portion as a cache. This controller is also referred to below as a cache controller. As described above, a garbage collector, or more generally, a flash management controller can use a different portion of the memory space, i.e. a second portion, which can be reserved for performing the garbage collection in the flash memory including the offering of spare blocks available after erasure, and possibly including storing the valid data from blocks of the first portion to be erased for freeing up memory space for the caching operations. Hence, preferably all the valid data assembled from across the entire memory space for freeing up pages and/or blocks for erasure can be copied to/stored in blocks of the second portion of the memory space. Preferably, the cache controller is adapted to change a size of at least one of the first portion and the second portion of the memory space during operation of the solid state memory.

Preferably, the total size of the memory space results from an accumulation of the size of the first portion assigned as cache and the size of the second portion assigned to garbage collection. This means that whenever the size of one of the first and the second portion is changed, the size of the respective other portion changes, too. It is preferred that the cache controller is adapted to change the size of the assigned first portion of the memory space, thereby impacting the size of the second portion of the memory space assigned to garbage collection, too, either immediately or with a certain latency. In this context, it is mentioned that the cache controller and the flash management controller are preferably embodied as separate controllers and be assigned to different entities of the computerized system: the cache controller can reside in the cache module or the host, for example, while the flash management controller is assigned to the flash memory and can, for example, reside inside an SSD.

In a preferred embodiment, the size of the first portion is reduced whereby, at least indirectly, the size of the second portion of the memory space used by the flash management, and specifically by the garbage collector, is increased. As a result, the solid state memory has more spare memory size in the second portion of the memory space, i.e., a higher over-provisioning, and specifically an effective over-provisioning that is above the reserved minimum size assigned to the second portion. In this way the write amplification can be lowered and the write performance to the cache can be increased significantly both in terms of throughput and in terms of latency. By means of adapting the memory size to caching and over-provisioning, the caching performance of a solid state memory is changed by resizing the cache which effectively increases over-provisioning and thus the overall cache I/O performance.

In other words, it is preferred to reduce the cache size so that the over-provisioned memory space increases which improves the efficiency of the garbage collection process. Given that for most solid state memories there are no means exposed to the user to change the user-visible capacity of the device, i.e., the size of the first portion of the memory space assigned to cache operations, it is preferred to perform such decrease in memory size of the first portion indirectly, for example by increasing a number of spare flash blocks.

While there may be no means for the cache controller as well to directly impact the number of spare flash blocks which task is assigned to the flash management controller, in a preferred embodiment, the cache controller issues a command to invalidate a region in the logical space of the first portion of the solid state memory not currently being used by the cache. In some embodiments, a TRIM or an UNMAP command can be representatives of such a command in the SATA or in the SCSI-protocol respectively and can be used to flag blocks that hold no valid data at the logical level, which can include that no data has been allocated to them or that previously allocated data on these blocks is now invalid.

Note that the tagging of such blocks is performed under the regime of the cache controller such that in view of caching operations, the one or more blocks can be flagged for being added to the free block pool of the first portion of the memory space. These same blocks may qualify for such tagging since, for example, they hold data that may be dispensed with best in caching because this data was not used for a long time but still is not yet removed from the cache by the regular cache allocation algorithm.

These blocks are now candidates for reclamation: they can then be proactively erased by the flash management thereby increasing the number of free flash blocks and thereby increasing the size of the second portion of the memory space, i.e. the over-provisioning. More importantly, the garbage collection process will find these blocks entirely, or at least almost entirely, invalid and can therefore reclaim them without having to do any relocation of valid data. Thus, the degree of write amplification is reduced and the write performance is increased. After a block is erased, it is added to the free block pool which is a data structure for blocks that have been erased and can be allocated for writes and which free block pool is assigned to the flash management and as such claims space in the over-provisioning. In that respect, the effective number of spare blocks of the device is changed by changing the size of the cache.

Preferably, the free block pool receives invalid or unused blocks returned from said first portion of the memory space assigned to cache operations with the aim of reducing the size of this first portion. Additionally, the free block pool is prepared for having its free blocks populated with data to be cached with the aim of increasing the size of the first portion. When the cache is populated with new data, the new data is allocated in the solid state memory and free space is taken out of free block pool to accommodate it.

Taking out this free space of the free block pool reduces the size of the over-provisioning, i.e., the second portion of the memory space and adds the newly written blocks to the cache. However, it is preferred that the reserved minimum space of the second portion be not underrun by allocating new data to spare blocks from the free block pool. When data is evicted from the cache, its underlying memory space is flagged as invalid and through the garbage collection process, these blocks are returned to free block pool of the solid state memory, thereby shrinking the cache and growing the overprovisioning.

When it comes to determining the point in time when it is best to change the size of the cache which is the first portion of the memory space, it is preferred to make a trigger for such change dependent on an average read and/or write latency. Therefore, the controller can keep track of the average read and/or write latency and compare it with an expected value. If the measured latency is larger than the expected latency by a given margin, the cache manager, also denoted as controller, then decides to reduce the cache size. If the measured latency is smaller than the expected latency by a given margin, the cache manager decides to increase the cache size. Preferably, after one decision is made, the next decision, will not be made for at least a given time period so that the changes of cache size can have an impact on the measured latency.

The average read latency can be defined as a latency that a user/application experiences in average for reading data from the storage system, i.e. the time between a read request being issued by the user and a supply of the data requested. The average write latency can be defined as a latency that a user/application experiences in average for writing data to the storage system, i.e., the time between a write request being issued by the user and an acknowledgement that the data is written. Other latency definitions can be used, e.g., by not referring to a specific user but to read/write requests from any user. While typically write latency may be higher than read latency, write latency may be used only as means for triggering the change in memory space allocation. In other embodiments, any combination of read and write latency, e.g. a weighed one may be used.

There may be alternatives for determining a triggering point in time when to change the size of the cache: for example, the trigger can depend on a desired read and/or write throughput to be achieved and thus, on a deviation of the current throughput from this desired throughput. Throughput in this context can be defined as read and/or write operations per second. Similar to the latency considerations, the relevant throughput can be relative to the user or the device, and can also be determined as a mix of weighed read and write throughput. In another example, the trigger can depend on a desired expected lifetime of the solid state memory.

When it comes to the decision as to which blocks to add to or to remove from the free block pool, it is preferred that a continuum of logical addresses of blocks either is removed from the first portion of the memory space, or is added to the first portion of the memory space from the free block pool. This can effectively avoid fragmentation of the cache address space after many rounds of increasing/decreasing the cache size.

Figure 1:
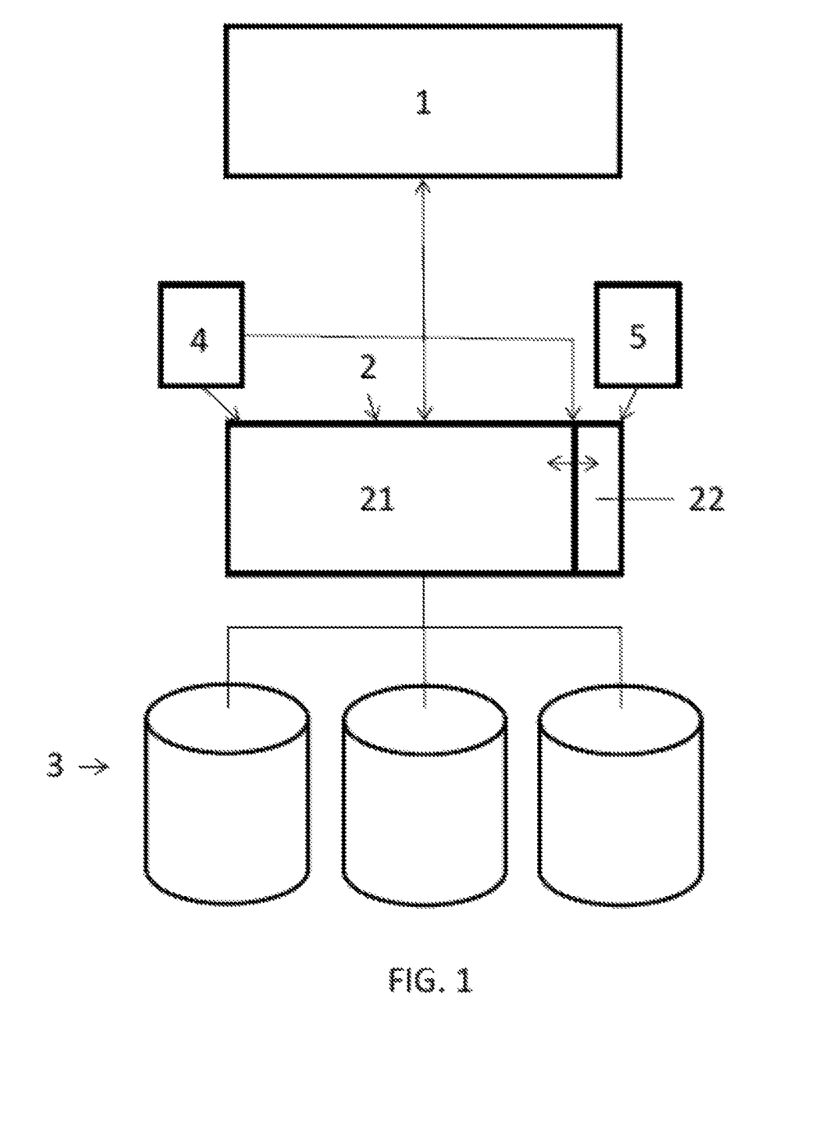
FIG. 1 illustrates a computerized system according to an embodiment of the present invention.

FIG. 1 illustrates a computerized system according to an embodiment of the present invention. It includes storage system 3 which in the present figure is indicated as an array of hard disk drives (HDD). Host computer 1 may require access to storage system 3 for reading and/or writing data. In between host computer 1 and storage system 3, solid state memory 2 is arranged in the form of a flash memory, for example, with first portion 21 of its memory space acting as a cache which is used for temporarily storing data that are frequently accessed for reading and/or writing from or to storage system 3.

Controller 4 controls the cache operations. Second portion 22 of the memory space is reserved for flash management processes such as garbage collection, and specifically, for collecting isolated valid data from individual blocks of first portion 21. The total size of the memory space of solid state memory 2 is built from accumulation of the memory space of first portion 21 and the memory space of second portion 22. The sizes of first and second portion 21, 22 can be changed dynamically by controller 4 as is indicated by the arrow.

Second portion 22 of the memory space can be operated by flash management controller 5, which specifically can include a garbage collection engine. The functions of controllers 4 and 5 can, in different embodiments, be implemented by a common hardware processing unit, or can be implemented by individual processing units. Controllers 4, 5 can commonly reside at a location of solid state memory 2 or not. Solid state memory 2 can be arranged at the location of storage system 3 or at the location of host 1.

Figure 2:
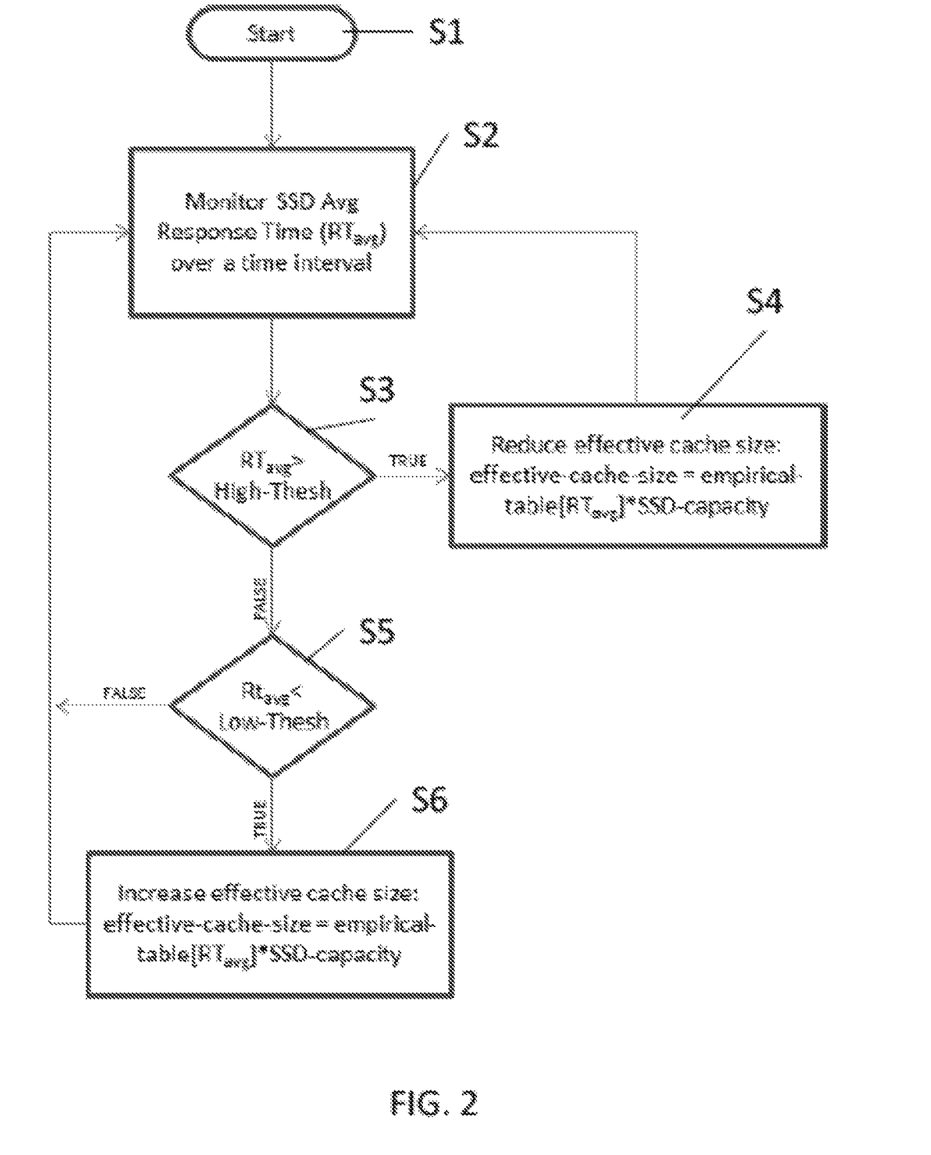
FIG. 2 shows a flow chart of a method for operating a solid state memory according to an embodiment of the present invention.

FIG. 2 illustrates a flow chart of a method for operating a solid state memory according to an embodiment of the present invention.

In various embodiments, the method of the present invention can include one or more of the following features: the size of the first portion of the memory space is reduced if an average read and/or write latency exceeds a first threshold; the size of said first portion of said memory space is increased if an average read and/or write latency is below a second threshold; the memory space includes a set of blocks: the size of the first portion of the memory space is reduced by returning invalid or unused blocks from the first portion to a free block pool; the size of the first portion of the memory space is reduced by returning a continuum of logical addresses of invalid or unused blocks from the first portion to the free block pool; the size of the first portion of the memory space is reduced by evicting data from valid blocks in the first portion and by subsequently returning these invalidated or unused blocks of the first portion to a free block pool; the size of the first portion of the memory space is reduced by marking invalid or unused blocks of the first portion as invalid or unused; the size of the first portion of the memory space is reduced by issuing a TRIM or an UNMAP command for marking the invalid or unused blocks of the first portion of the memory space as invalid or unused; the size of the first portion of said memory space is increased by populating free blocks of a free block pool with data to be cached; the size of the first portion of said memory space is increased by populating a continuum of logical addresses of free blocks of the free block pool with data to be cached; a number of invalid or unused blocks to be returned to the free block pool and/or a number of free blocks from the free block pool to be populated is determined dependent on an average read and/or write latency; a number of invalid or unused blocks to be returned to the free block pool and/or a number of free blocks from the free block pool to be populated is determined dependent on the desired read and write throughput; a number of invalid or unused blocks to be returned to the free block pool and/or a number of free blocks from the free block pool to be populated is determined dependent on the desired expected lifetime of the device; a number of invalid or unused blocks to be returned to the free block pool and/or a number of free blocks from the free block pool to be populated is determined dependent on a difference between the average read and/or write latency and a utilization of the first portion; a number of invalid or unused blocks to be returned to the free block pool and/or a number of free blocks from the free block pool to be populated is a fixed number defined upfront.

As shown in FIG. 2, in step S1, the method starts. In step S2, an average response time/latency $RT_{avg}$ for accessing the cache is determined over a time interval. In the next step, S3, this average latency is compared to a first threshold "High-Thresh".

In the case where the average latency $RT_{avg}$ exceeds the first threshold "High-Thresh" (TRUE), in step S4, the effective cache size of the first portion of memory space is reduced. The effective cache size can, for example, be determined according to an empirical table times the SSD capacity. Such an empirical table, in one embodiment, may point out what is the required utilization level to achieve a desired latency, e.g., to achieve a latency of 1 ms a utilization of 50% may be required; to achieve a latency of 2 ms, a utilization of 55% to achieve a latency of 4 ms, a utilization of 60% may be required; and to achieve a latency of 8 ms, a utilization of 70% may be required.

In the case where the average latency $RT_{avg}$ does not exceed the first threshold "High-Thresh" (FALSE), it is evaluated in step S5 if the average latency $RT_{avg}$ is lower than a second threshold "Low-Thresh".

In the case where the average latency $RT_{avg}$ is lower than the second threshold (TRUE), in step S6 the effective cache size of the first portion of the memory space is increased. The effective cache size can, for example, be determined according to an empirical table times the SSD capacity such as the one introduced above as an example.

In the case where the average latency $RT_{avg}$ does not exceed the second threshold (FALSE), it is returned to step S2, and a new average latency $RT_{avg}$ value is determined.

Utilization, presently and in the following, can be defined as logical capacity presented to the used/physical capacity of the solid state memory. For example, in a solid state memory that uses 30% of the physical blocks as spare blocks, the utilization would be 70%.

In the example of the FIG. 2, the cache size is adapted in a step by-step iterative manner. The amount by which the cache size is increased or decreased is rather low, and specifically, can be a fixed amount. Hence in a preferred embodiment, every time an increasing/decreasing decision is made for the size of the cache, the cache is increased/ decreased by a fixed, relatively small amount, so that after multiple iterations the cache will eventually converge to its optimum size.

In another embodiment, the cache resizing can happen in sort of a one-shot manner. Here it is preferred to first calculate a difference of the measured average latency $RT_{avg}$ and the expected one, and based on the difference and a curve of latency versus utilization, how much memory space needs to be freed-up or added can be exactly computed. Preferably, the method is based on a way to accurately estimate I/O latency across a wide range of storage space utilization. As an example, if it is known that the device exhibits a 4 ms write latency at a utilization level of 70% and 1 ms at a utilization level of 60%, then the system knows that in order to bring the write latency from 4 ms down to 1 ms, it would need to free up enough space such that the utilization will drop down to 60%, i.e. the number of spare blocks would be equal to 40% of the physical capacity.

Generally, there can be two approaches to using solid state memory for caching. In a first approach, as mainly described in the previous embodiments, a cache is built on top of a solid state drive, where only a logical address space is exposed to the cache controller while the flash management controller is separate from the cache controller. In another embodiment, the solid state memory is directly managed as a cache, where the physical solid state memory is exposed to the cache management component, i.e. the cache controller.

Generally, the size of a block with respect to caching activities may differ from the size of a physical block in the solid state memory. This can have the effect that the cache controller tags individual units of such physical block as unused but not the entire physical block. The garbage collector can then still perform garbage collection on physical blocks that contain a high number of invalid units, where prior to an erasure of such blocks, a relocation of valid units is performed by the garbage collector.

Generally, a solid state memory, as presently used, preferably includes a device that includes multiple dies per channel and multiple channels. In solid state memory, a die is understood as an entity that can independently execute commands and typically includes a set of blocks. This can ensure that page/block relocation requests from other channels as well as host requests can be satisfied in parallel by keeping the channels occupied. Hence, multiple channels are utilized to increase the overall write rate.

Write operations to different dies attached to the same or different channels can be triggered one after the other without having to wait for the completion of the first write operation. In other words, while a data transfer to one die is ongoing, other dies can complete their write operations as they have the data to be written in local buffers. An allocation engine takes these hardware properties into account and serves free pages in a way to optimize channel utilization for write requests. The allocation engine can serve pages for host and block reclaiming write requests. It can get itself free blocks from a free block pool, or alternatively or additionally directly from the block reclaiming process. In order to balance the write workload to all available channels and dies, the allocation engine can utilize a round robin scheme that allocates pages from each channel and die in a round robin fashion in a very efficient and yet simple way. In a first round, pages are allocated from a first die in a channel for each channel. In a second round, pages are allocated from a second die from each channel and so on. In a preferred embodiment, the allocation scheme can be adapted dynamically, depending on the number of total write requests a die or channel is expected to accept until the end of life.

A further aspect of the present invention provides a computer program product that includes a computer readable medium having computer readable program code embodied therewith. The computer readable program code includes computer readable program code configured to perform the method according to any one of the preceding embodiments.

As will be appreciated by one skilled in the art, aspects of the present invention may be embodied as a system, method or computer program product. Accordingly, aspects of the present invention, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that method steps may be executed in a different order than listed in a method claim. Such different order shall also be included in the scope of such claim as is the order of steps as presently listed.

Embodiments described in relation to the aspect of a system shall also be considered as embodiments disclosed in connection with any of the other categories such as the method, the computer program product, etc., and vice versa.

We claim:

1. A computerized system, comprising:
   a solid state memory containing a memory space, said memory space including a first portion and a second portion, said second portion reserved for depositing valid data blocks to be erased and maintaining a pool of free blocks to be offered after erasure, wherein a size of said first portion of said memory space and a size of said second portion of said memory space accumulate to a total size of said memory space;
   a controller configured to use said first portion of said memory space as a cache for said computerized system; and
   a garbage collector configured to use said second portion of said memory space for performing garbage collection in said solid state memory;
   wherein said controller is configured to change a size of one of said first portion and said second portion of said memory space during operation of said solid state memory,
   wherein when the controller changes the size of the first or second portion, the size of the respective other portion changes to maintain the total size of the memory space,
   wherein
   said size of said first portion of said memory space is reduced when the average read latency is greater than a first threshold, and
   said size of said first portion of said memory space is increased when the average read latency is less than a second threshold.

2. The computerized system of claim 1, wherein said memory space includes a set of blocks, and wherein said computerized system includes a pool of free blocks for returning invalid or unused blocks to from said first portion for reducing said size of said first portion, and for populating free blocks from said free block pool with data to be cached for increasing said size of said first portion.

3. The computerized system of claim 1, wherein said second portion of said memory space is reserved for storing all valid data assembled from across the entire memory space for freeing up at least one of pages and blocks for erasure.

4. The computerized system of claim 1, wherein said controller is configured to change the size of said first portion of said memory space while caching operations continue to be performed on the first portion.

5. The computerized system of claim 4, wherein the controller maintains the changed sizes of the first and second portion for caching operations.

6. The computerized system of claim 1, wherein the change in the size of the first portion of the memory is based on an empirical table correlating required utilization level to desired latencies, wherein the size in which the first portion is changed corresponds to a required utilization level selected based on the average write and/or write latency.

7. A method for operating a solid-state memory containing a memory space, the method comprising:
   using a first portion of said memory space as a cache for a computerized system;
   performing garbage collection in said solid state memory and using a second portion of said memory space for garbage collected data, said second portion reserved for depositing valid data blocks to be erased and maintaining a pool of free blocks to be offered after erasure, wherein a size of said first portion of said memory space and a size of said second portion of said memory space accumulate to a total size of said memory space; and changing, via a controller, said size of one of said first portion and said second portion of said memory space during operation of said solid state memory, wherein when the controller changes the size of the first or second portion, the size of the respective other portion changes to maintain the total size of the memory space, wherein said size of said first portion of said memory space is reduced when the average read latency is greater than a first threshold, and said size of said first portion of said memory space is increased when the average read latency is less than a second threshold.

8. The method of claim 7, wherein said memory space includes a set of blocks, and wherein said size of said first portion of said memory space is reduced by returning invalid or unused blocks from said first portion to a free block pool, and in particular by returning a continuum of logical addresses of invalid or unused blocks from said first portion to said free block pool.

9. The method of claim 8, wherein said memory space includes a set of blocks, and wherein said size of said first portion of said memory space is reduced by evicting data from valid blocks in said first portion and by subsequently returning invalidated or unused blocks of said first portion to a free block pool.

10. The method of claim 8, wherein said size of said first portion of said memory space is reduced by marking invalid or unused blocks of said first portion as invalid or unused, and by issuing a TRIM or an UNMAP command for marking said invalid or unused blocks of said first portion of said memory space as invalid or unused.

11. The method of claim 8, wherein said memory space includes a set of blocks, and wherein said size of said first portion of said memory space is increased by populating free blocks of a free block pool with data to be cached, and by populating a continuum of logical addresses of free blocks of said free block pool with data to be cached.

12. A computer program product for operating a solid state memory containing a memory space, the computer program product comprising:

a non-transitory computer readable storage medium having stored thereon:

first program instructions executable by a device to cause the device use a first portion of the memory space as a cache for a computerized system;

second program instructions executable by the device to cause the device to perform garbage collection in the solid state memory and use a second portion of the memory space for garbage collected data, said second portion reserved for depositing valid data blocks to be erased and maintaining a pool of free blocks to be offered after erasure, wherein a size of said first portion of said memory space and a size of said second portion of said memory space accumulate to a total size of said memory space; and third program instructions executable by the device to cause the device to change said size of one of the first portion and the second portion of the memory space during operation of the solid state memory, wherein when the size of the first or second portion is changed, the size of the respective other portion changes to maintain the total size of the memory space, wherein said size of said first portion of said memory space is reduced when the average read latency is greater than a first threshold, and said size of said first portion of said memory space is increased when the average read latency is less than a second threshold.

13. The computer program product of claim 12, wherein the memory space includes a set of blocks, and wherein the size of the first portion of the memory space is reduced by returning invalid or unused blocks from the first portion to a free block pool, and in particular by returning a continuum of logical addresses of invalid or unused blocks from the first portion to the free block pool.

14. The computer program product of claim 12, wherein the memory space includes a set of blocks, and wherein the size of the first portion of the memory space is reduced by evicting data from valid blocks in the first portion and by subsequently returning invalidated or unused blocks of the first portion to a free block pool.

* * * * *